Patented May 7, 1946

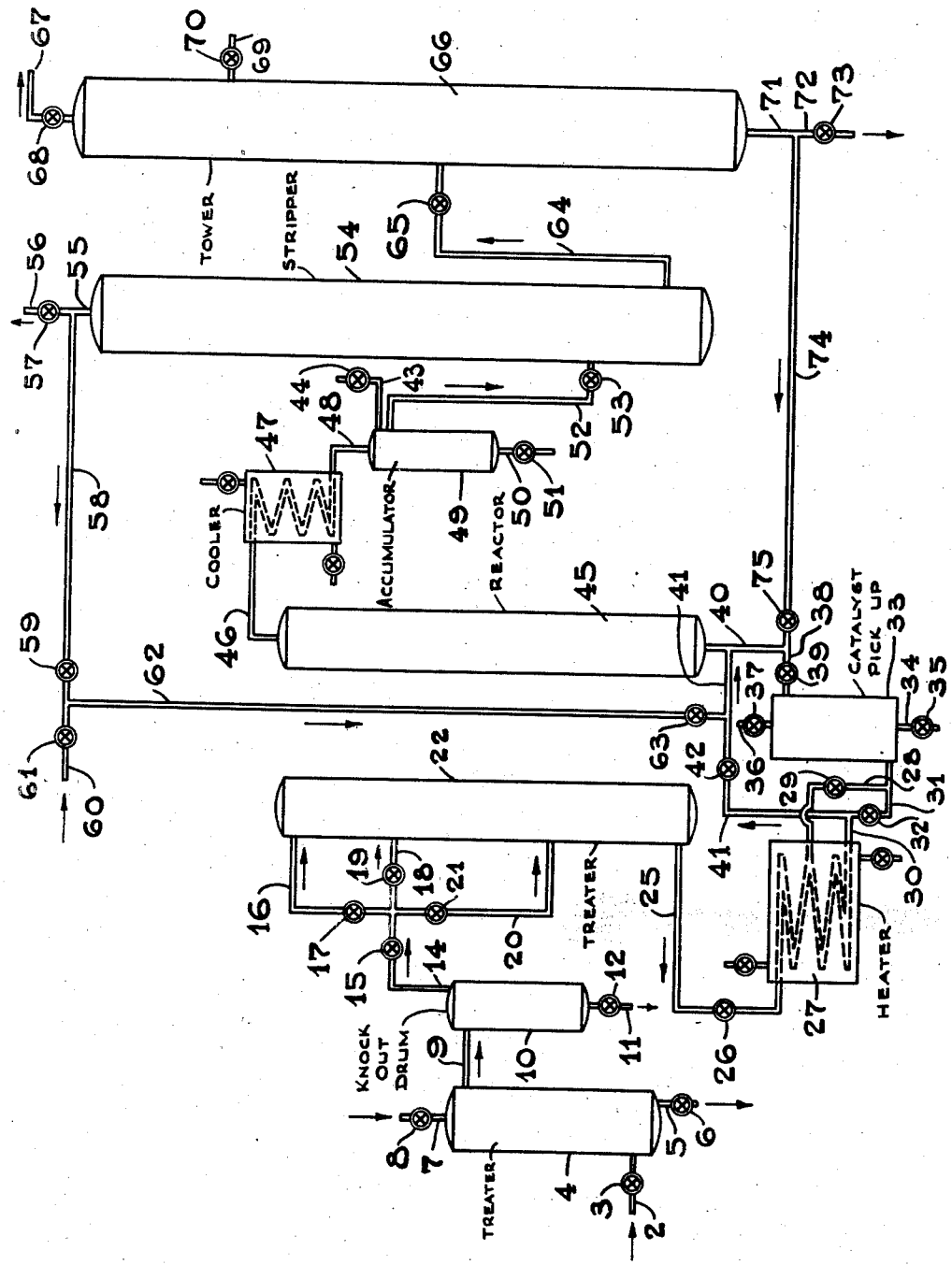

2,399,883

UNITED STATES PATENT OFFICE 2,399,883

ISOMERIZATION PROCESS

Norval F. Myers, Short Hills, N. J., assignor to Standard Oil Development Company, a corporation of Delaware Application January 11, 1944, Serial No. 517,815

12 Claims. (Cl. 260—683.5)

This application is a continuation-in-part of copending application Serial No. 422,820, filed December 13, 1941.

The present invention relates to a process for the catalytic isomerization of paraffinic hydrocarbons. In particular, it relates to the catalytic isomerization of normal paraffinic hydrocarbons having at least four carbon atoms in the molecule wherein feed stocks predominating in these types of hydrocarbons are subjected to the action of Friedel-Crafts type catalysts, in the presence of halogen-containing promoters under suitable isomerization reaction conditions to produce the corresponding branched chain paraffinic hydrocarbons.

The straight chain paraffins of at least four carbon atoms per molecule have been isomerized in the presence of Friedel-Crafts type catalysts and halogen-containing promoters to produce branched chain paraffins. However, numerous efforts have been made to increase the efficiency of the catalyst employed to minimize the degradation of the feed stock while in contact with that catalyst and to obtain the highest possible yields of the desired isoparaffins consistent with the minimizing of catalyst and reactant degradation. Particularly in petroleum refineries large quantities of light hydrocarbon mixtures are available but because of the fact that these mixtures oftentimes are contaminated with impurities, by reason of the particular source of the crude oil from which they are derived or by reason of some preceding refinery operation from which they are produced, they are not particularly suitable for economic utilization in normal paraffin isomerization processes. Numerous methods have been proposed, for example, for the removal of olefins from refinery C₄ cuts, said cuts being otherwise suitable for subjecting to isomerization. Thus, for example, the alkylation of the olefinic content of a refinery C₄ cut has proved feasible. This is particularly true where large quantities of olefins are found in such feed stocks but it is hardly feasible to utilize such a refinery cut if only small amounts of olefins are present therein. In such cases, resort has been made in the past to pretreating the feed stock to an isomerization reaction zone employing a Friedel-Crafts type catalyst with spent or partially spent aluminum chloride to polymerize the olefinic content thereof and remove the same as sludge or hydrocarbon liquid. Also, pretreatments with sulfuric acid of various concentrations have been resorted to, to remove traces of olefins and of water from normal paraffin isomeriaztion feed stocks. Various other processes are known. Likewise, it has been found desirable to remove sulfur and sulfur-containing compounds from the feed stocks. The sulfur and sulfur-containing impurities are present in the feed stocks by reason of the crude from which the hydrocarbons are derived or by reason of some previous treating operation in the refinery. It has been found that these sulfur bodies are likewise deleterious to the most efficient utilization of the Friedel-Crafts type catalysts and should be removed from the feed stocks prior to contacting the same under isomerization conditions with the heretofore-mentioned catalysts.

It is an object of the present invention to provide an improved practical and economical process for the catalytic isomerization of normal paraffins of at least four carbon atoms per molecule to the corresponding isoparaffins. In particular, it is an object of the invention to avoid in so far as possible excessive catalyst degradation in such reactions due to impurities and poisons contained in the feed stocks employed. It is a further object of the invention to provide an improved method for the isomerization of hydrocarbon mixtures predominating essentially in normal paraffins of at least four carbon atoms per molecule, said mixtures primarily originating in petroleum refinery operations and containing small mounts of olefins, moisture and/or sulfur bodies, said bodies having been found to be deleterious to efficient and economical use of the Friedel-Crafts type catalysts. Other objects will be apparent upon a fuller understanding of the invention to be more fully hereinafter described.

It has now been found expedient in carrying out a commercial operation of this type, particularly where ordinary refinery C₄ and/or C₅ feed stocks are employed, to subject the feed stocks which are known to contain water and/or olefins, such as butenes, pentenes, or lower molecular weight monoolefins, to a pretreatment with a suitable agent for the removal of water and/or olefins if they are present in objectionable quantities. Such a treatment may embody the use of concentrated sulfuric acid of the order of 98%. or higher, or the use of chlorsulfonic or fluorsulfonic acid for the same purpose, or various other types of common expedients for removal of olefins. In cases where concentrated sulfuric acids are so employed, it is preferable, in order to prevent any chemical degradation of aluminum chloride by contact with small amounts of entrained sulfuric acid, to pass the feed stock so treated through a suitable filter filled with a coagulating or adsorbing medium in order to condition the feed for its subsequent isomerization treatment. Such substances should usually be substantially water-free and should be capable of adsorbing sulfuric acid readily. For example, bauxite may be employed, as well as other substances commonly employed in such treatments. This pretreatment is best carried out in liquid phase operation in which the feed stock is maintained in liquid state through the clay filter treatment.

In general, the process of the present invention resides in the pretreatment of olefin-containing hydrocarbon mixtures, which also contain substantial amounts of normal paraffins of at least four carbon atoms per molecule, with sulfuric acid of at least 80% concentration, at room temperature or in general between about 50° F. and about 150° F. to remove from the feed stock the olefinic impurities contained therein. It has been discovered, however, that such a treatment alone is not sufficient to preserve the most efficient activity of the catalyst mass. Attempts have been made to remove the sulfur bodies which may have been present originally, that is, prior to the pretreatment with sulfuric acid, or which may have been introduced into the feed stock by reason of the sulfuric acid pretreatment, by means of a knockout drum or some other suitable device which depends upon gravity separation of small amounts of residual sulfuric acid and other sulfur bodies contained in the isomerization feed gases. This has proved ineffective. It has been found that the feed stock after passage through the sulfuric acid absorber and drier still contains small quantities of sulfur compounds which cannot be removed by a knockout drum or by filtration.

It has now been discovered further that in order to preserve the highest activity for the Friedel-Crafts type catalysts, say, for example, aluminum chloride, for its use in the isomerization of normal paraffins, that a second and subsequent treatment of the feed gases is necessary. This pretreatment immediately follows the pretreatment with sulfuric acid as heretofore specified and consists in contacting the feed stock for the isomerization reaction with a porous adsorbent which, it has been found, is very effective in the removal of the sulfur bodies from the feed stream. By the use of such a feed stock so pretreated, the catalyst life of the aluminum chloride, for example, has been greatly increased. Also, the yield of desired isoparaffins has been increased as compared with the catalyst life and yield of isoparaffins obtained in cases where the pretreatment with adsorbent materials has been omitted. It is preferred that the sulfuric acid and adsorbent material treatments be carried out with the feed stock in the liquid phase, although improved results are also obtained where these pretreatments are carried out with the feed stock being in the vapor phase. The relative amounts of sulfuric acid and adsorbent material required depend to a large extent upon the amount of impurities to be removed and it is readily apparent to those familiar with absorption and adsorption operations the amounts of materials required to accomplish the desired impurity removal. As the sulfuric acid and adsorbent material become saturated with the products removed, fresh quantities of acid and adsorbent materials should be added and the spent materials removed from the contacting chambers.

The adsorbent material employed may be one or a mixture of two or more of the following materials: Activated Alumina, alumina gel, bauxite, Porocel, silica gel, diatomaceous earth, kaolin, bentonite, kieselguhr, and so forth. It is preferred, however, to employ those materials comprising essentially alumina as their base, although the other adsorptives mentioned are also highly useful. Since the Friedel-Crafts type catalysts employed as isomerization catalysts are deleteriously affected by the presence of free water, it is desirable to employ in the first treating step a sulfuric acid concentration sufficiently high to remove water from the feed stock. This is accomplished by the use of sulfuric acid of at least 80% strength. Also, in the use of adsorptive materials, it is desired that they be in substantially anhydrous condition, at least to the point where no free water is given off under the adsorption conditions obtaining. The conditioning of the adsorptive materials for use in the second pretreating step is readily accomplished by simply heating the materials to a temperature of from about 500° F. or 600° F. up to 1100° F. or 1200° F. for a period of time ranging between about 1 hour and about 7 or 8 hours. It will be understood, of course, that temperatures and times outside of these ranges are equally effective so long as the free water which may be given off during the pretreating steps is effectively removed prior to the use of these materials for the pretreatment of the feed stocks and so long as adsorptivity is not reduced by excessive heat treatment. When used in the specification and claims, the terms "sulfur compounds" and "sulfur bodies" are intended to include elemental sulfur and the simple esters and salts of inorganic and organic compounds containing sulfur, as well as hydrogen sulfide, mercaptans, sulfides and sulfonates.

The accompanying drawing represents in more or less diagrammatical sectional elevation a flow plan depicting a suitable installation of the two pretreatment steps when used in conjunction with a normal paraffin isomerization reaction. Referring to the drawing, a feed stock such as, for example, normal butane, normal pentane or the higher homologues thereof, or hydrocarbon mixtures predominating in these compounds which contain small amounts of sulfur bodies, water and/or olefins as impurities therein, is introduced in the liquid phase, by means of line 2, controlled by valve 3, into absorber 4 which is substantially filled with sulfuric acid of at least 80% concentration, preferably 85–98% concentration, by means of line 7, controlled by valve 8. This operation is carried out at a temperature ranging between about 50° F. and about 150° F., preferably at room temperature, and absorber 4 normally is packed with Raschig rings, or other steps taken to improve the degree of contact of the liquids therein. If necessary, sufficient superatmospheric pressure may be maintained on not only absorber 4 but also throughout the system to maintain liquid phase operation where specified. Continued passage of the feed stock through the sulfuric acid in absorber 4 results finally in the saturation of the sulfuric acid, and spent acid may be withdrawn through line 5, controlled by valve 6, and fresh acid introduced through line 7, controlled by valve 8. The liquid hydrocarbon mixture such as, for example, a refinery C₄ cut containing a preponderating amount of normal butane, is then passed through line 9 into knockout drum 10 where small amounts of entrained droplets of sulfuric acid and liquid impurities fall to the bottom of knockout drum 10 by gravity and are removed from the system by line 11, controlled by valve 12. The liquid freed of these droplets is withdrawn from knockout drum 10 by means of line 14, controlled by valve 15, and may then follow one or any combination or all of three possible paths, depending upon the quantity of impurities contained in the normal butane liquid being subjected to the second treating operation. Thus, for example, the feed material may pass through line 16, controlled by valve 17, through line 18, controlled by valve 19, or through line 20, controlled by valve 21, or through all three lines or any combination of two of these lines, into the treating tower 22 which is substantially filled with a Porocel which is at least partially dehydrated, at least to the extent that no free water is given off under the adsorbent conditions maintained. Means are provided (not shown) at the top and bottom of treating tower 22 for the introduction of fresh treating agent and for the removal of spent treating agent, respectively. A partially dehydrated bauxite such as Porocel is employed in the treating tower 22 and the liquid feed is allowed to percolate downwardly therethrough, being then withdrawn from the bottom of tower 22 by means of line 25, controlled by valve 26. Treating tower 22 may also be arranged for upflow operation if desired.

The feed stock so purified, and from which the contaminants have been removed, is then subjected to an isomerization treatment which embodies the heating of the feed stock, that is, normal butane in the present instance, by means of heater 27 to the desired isomerization reaction temperature. A drawoff line 28, provided with valve 29, is attached to the heating coil in heater 27 at an intermediate point so that only a partial heating is attained for that portion of the feed stock so withdrawn, whereas the fully heated feed stock is withdrawn through line 30, controlled by valves 32 and 42. This partial heating of the feed stock is designed for the control of the temperature of the feed stock in line 31 just prior to entering the catalyst pickup chamber 33, which is at least partially filled with lumps or solid particles of aluminum chloride. The temperature of the hydrocarbon gases entering pickup chamber 33 through line 31 and passing upwardly through this partially sublimes the aluminum chloride and carries the same, by means of line 38, controlled by valve 39, and line 40, into the bottom of the isomerization reaction chamber 45 which contains, and is substantially filled with, a suitable carrier such as Porocel having a water content ranging somewhere between about 0.5% and 2%. The aluminum chloride vapors are deposited on this Porocel and thereby form the catalyst bed. These vapors are also introduced at a rate and in an amount sufficient to maintain the active aluminum chloride content of the catalyst bed in reactor 45 substantially constant, and this is accomplished by regulating the temperature of the normal butane vapors entering the bottom of the catalyst pickup chamber 33 through control of valves 29 and 39. Once the isomerization reaction is under way and the catalyst bed is formed, so that only a substantially constant active aluminum chloride content need be maintained, only a portion of the feed vapors need pass either continuously or intermittently through catalyst pickup zone 33 while the greater portion of these vapors by-pass catalyst pickup chamber 33 and enter the reactor tower 45 by means of line 41, controlled by valve 42, which joins with line 40 at the bottom of the reactor tower 45. Hydrogen chloride promoter in the amount ranging between about 2% and about 22%, preferably between about 4% and about 12 weight percent, based on hydrocarbon charge to the reactor, is introduced into the system through line 60, controlled by valve 61, passes by means of line 62, controlled by valve 63, into admixture with the normal butane vapors in line 41 and enters the reaction zone through line 40. The temperature of the normal butane vapors passing from heater 27 through line 30 is generally between about 250° F. and about 350° F., while the temperature of the vapors passing from heater 27 through line 28 is generally between about 220° F. and about 300° F. The catalyst bed in reactor 45 is maintained with an aluminum chloride concentration ranging between about 8 and about 18 weight percent, preferably between 12 and 14 weight percent, although good isomerization is accomplished if higher or lower quantities of aluminum chloride are employed in the catalyst bed. Preferably, hydrogen chloride is not added to the reaction zone while the aluminum chloride vapors admixed with normal paraffin feed stock are being intermittently introduced into the catalyst bed.

The feed is passed through reactor 45 at a rate of throughput between about 0.5 and about 2 v./v./hr., although it is understood that throughput rates outside of this particular range may also be maintained with only a slight decrease in the overall yield of desired product. The vapors passing overhead through line 46 enter cooler 47, where they are condensed to liquid, and by means of line 48 are passed into accumulator drum 49. Any small particles of solid materials such as solid aluminum chloride or heavy liquid sludge which may have been entrained in the vapors in line 46 are settled and removed through line 50, controlled by valve 51. If desired, vent pipe 43, provided with valve 44, serves to permit the removal of small amounts of permanent gases formed in the process. The liquid product is then withdrawn through line 52, controlled by valve 53, and enters stripping tower 54 which is designed to remove as overhead through line 55 substantially all of the hydrogen chloride from the reacted mixture. The stripping tower 54 may be designed and operated to permit the removal of substantial quantities of lighter degradation products together with the unreacted normal butane and the product of the reaction, isobutane, as bottoms therefrom. Molecular hydrogen may be employed in the isomerization process to suppress degradation. In such a case, the molecular hydrogen likewise is withdrawn overhead from stripping tower 54 through line 55. A portion or all of these overhead materials may be bled from the system through line 56, controlled by valve 57. Generally, however, the greater part, if not all, of this overhead is returned to the reaction zone in reactor 45 by means of line 58, valve 59, line 62, valve 63, and lines 41 and 40. Hydrogen chloride is introduced into the system as required, through line 60, controlled by valve 61. The bottoms from stripper 54 are passed, by means of line 64 and open valve 65, into fractionating tower 66 where any residual light degradation products are removed overhead through line 67, controlled by valve 68. The desired isobutane fraction is withdrawn through line 69, controlled by valve 70, and the unreacted normal butane and heavy degradation products of the reaction, if any, are withdrawn as bottoms from tower 66 through line 71. A portion or all of these products may be withdrawn from the system through line 72, controlled by valve 73. Generally, however, the greater portion of these bottoms consisting of normal butane are recycled to the reactor 45 by means of line 74, valve 75 and line 40 after first fractionating them to recover normal butane for recycling. The heavy bottoms are withdrawn from the system.

It is not essential that the isomerization reaction itself be conducted in the vapor phase, although that is a preferred embodiment of the isomerization process when the feed stock is butane. The above described illustration with reference to the isomerization process may be conducted in liquid phase and at much lower temperatures. The above description with reference to the isomerization reaction and the process employed for carrying out the same is given so that a complete description of the invention which resides in the pretreating operations is fully understood. In general, the isomerization catalyst, feed stock and conditions are well known and in so far as the isomerization itself is concerned do not form a part of the invention except in so far as it is employed in conjunction with the pretreating steps previously described.

*Example*

An isomerization reaction was carried out using a refinery C₄ cut which contained about 0.1% of C₄ olefins and which also contained small quantities of moisture. In one instance, a vapor phase isomerization of this feed stock with a catalyst comprising aluminum chloride deposited on Porocel was employed in the absence of a pretreating operation but very poor results were obtained, as would be expected by those familiar with the process, whereas in the second instance a pretreating operation with sulfuric acid alone, and then with sulfuric acid followed by Porocel, was carried out. The sulfur content of the feed stock was almost negligible as it was originally received. The reaction was carried out in a tower maintained at about 300° F., under a pressure of about 200 pounds per square inch gauge. The refinery C₄ cut was passed at the rate of about 1 liquid volume of feed per volume of catalyst per hour through the reactor which was about 1.5 inches in diameter by about 4 feet high, this reactor being filled with Porocel which had been previously heated to about 1000° F. for about 12 hours. All of the aluminum chloride was added as a vapor in the normal butane feed stock. About 6 weight percent of hydrogen chloride based on the feed was separately added to the reaction and was mixed on entering the reactor. A drum of solid granular aluminum chloride was maintained at about the same temperature as that of the reactor and the normal butane gas served as a carrier for the sublimed aluminum chloride. Measured amounts of aluminum chloride were placed in this catalyst pickup chamber from time to time. In the pretreatment with sulfuric acid, the acid concentration was held at 90–98% and the temperature of the sulfuric acid was maintained at about room temperature. The Porocel, in the case where Porocel was employed following the sulfuric acid pretreatment, was also maintained at room temperature. An analysis of the feed stock coming from the sulfuric acid pretreatment was made by conventional means. The reaction conditions were so adjusted as to maintain a substantially constant conversion of about 40% of the normal butane to isobutane. The following data were obtained:

| Catalyst | AlCl₃ on Porocel | |
|---|---|---|
| Pretreatment of feed | H₂SO₄ | H₂SO₄—Porocel |
| Sulfur content of treated feed, wt. per cent | .0040 | .0006–.0009 |
| Catalyst life—gals. iso C₄ per lb. AlCl₃— | | |
| On 1st AlCl₃ charge (8% based on Porocel while isomerizing) | 33 | 40 |
| On 2nd AlCl₃ charge (4% based on Porocel) | 64 | 136 |
| On 3rd AlCl₃ charge (4% based on Porocel) | 52 | 103 |

It will be noted that the aluminum chloride was about twice as effective for catalyzing the isomerization reaction where a Porocel treatment of the feed stock followed the sulfuric acid treatment as in the case where a simple sulfuric acid treatment alone was employed.

Having thus fully described and illustrated the nature of the invention, what is desired to be secured by Letters Patent is:

1. In a process of isomerizing straight chain paraffins of at least four carbon atoms per molecule in the presence of a Friedel-Crafts type catalyst and a halogen-halide promoter under isomerization reaction conditions to produce branched chain paraffins, wherein a feed stock containing said straight chain paraffins is pretreated with a concentrated mineral sulfur-oxygen acid to remove impurities therefrom, the improvement comprising contacting the acid-treated feed stock with a porous alumina prior to isomerizing the said straight chain paraffin feed stock.

2. In a process of isomerizing straight chain paraffins of at least four carbon atoms per molecule in the presence of a Friedel-Crafts type catalyst and a halogen-halide promoter under isomerization reaction conditions to produce branched chain paraffins, wherein a feed stock containing said straight chain paraffins is pretreated with a concentrated mineral sulfur-oxygen acid to remove impurities therefrom, the improvement comprising contacting the acid-treated feed stock with at least a partially dehydrated bauxite prior to isomerizing the said straight chain paraffin feed stock.

3. In a process of isomerizing straight chain paraffins of at least four carbon atoms per molecule, in the vapor phase, in the presence of aluminum chloride on a partially dehydrated bauxite and in the presence of promotional amounts of hydrogen chloride, under isomerization reaction conditions, to produce the corresponding branched chain paraffins, the improvements comprising treating a feed stock containing said straight chain paraffins with sulfuric acid of at least 80% concentration followed by treating the feed stock with at least a partially dehydrated bauxite which has previously been heated to a sufficiently high temperature to insure that substantially no free water will be given off under the conditions obtaining prior to isomerizing the straight chain paraffin feed stock.

4. In a process of isomerizing straight chain paraffins of at least four carbon atoms per molecule, in the vapor phase, in the presence of aluminum chloride on a partially dehydrated bauxite and in the presence of promotional amounts of hydrogen chloride, under isomerization reaction conditions, to produce the corresponding branched chain paraffin, the improvements comprising treating a feed stock containing said straight chain paraffins with sulfuric acid of at least 80% concentration followed by treating the feed stock with at least a partially dehydrated bauxite which has been previously heated to a sufficiently high temperature to insure that substantially no free water will be given off under the conditions obtaining prior to isomerizing the straight chain paraffin feed stock, and wherein both pretreatments are carried out with the feed stock being in the liquid phase.

5. In a process of isomerizing straight chain paraffins of at least four carbon atoms per molecule, in the vapor phase, in the presence of aluminum chloride on a partially dehydrated bauxite and in the presence of promotional amounts of hydrogen chloride, under isomerization reaction conditions, to produce the corresponding branched chain paraffin, the improvements comprising treating a feed stock containing said straight chain paraffins with sulfuric acid of between about 85% and about 100% concentration followed by treating the feed stock with at least a partially dehydrated bauxite which has previously been heated to a sufficiently high temperature to insure that substantially no free water will be given off under the conditions obtaining prior to isomerizing the straight chain paraffin feed stock.

6. A process as in claim 3 wherein the catalyst carrier and the material employed in the second pretreating operation are substantially identical.

7. A process for the isomerization of normal paraffins of at least four carbon atoms per molecule in the presence of aluminum chloride and hydrogen chloride under isomerization reaction conditions, the steps comprising pretreating a feed stock containing said normal paraffins in the liquid phase with sulfuric acid of at least 80% concentration to remove impurities deleterious to the isomerizing activity of the aluminum chloride, followed by liquid phase contacting of the feed stock so treated with at least a partially dehydrated bauxite incapable of giving off free water under the conditions obtaining, thereby removing sulfur bodies from the feed stock and then subjecting the same to the isomerization reaction.

8. A process as in claim 7 wherein the feed stock is essentially normal butane but contains small amounts of olefins as impurities therein.

9. A process as in claim 7 wherein the feed stock is essentially normal pentane but contains small amounts of olefins as impurities therein.

10. A process as in claim 7 wherein the bauxite pretreatment is carried out at a temperature of between about 50° F. and about 150° F.

11. A process as in claim 7 wherein the bauxite pretreatment is carried out at a temperature of between about 50° F. and about 150° F. and wherein the isomerization reaction is carried out at a temperature of between about 250° F. and about 350° F. in the vapor phase.

12. A process as in claim 7 wherein the bauxite pretreatment is carried out at a temperature of between about 50° F. and about 150° F., wherein the isomerization reaction is carried out at a temperature of between about 250° F. and about 350° F. in the vapor phase and wherein the sulfuric acid is of a concentration between about 85% and about 100%.

NORVAL F. MYERS.